United States Patent [19]
Thusoo et al.

[11] Patent Number: 5,809,272
[45] Date of Patent: Sep. 15, 1998

[54] EARLY INSTRUCTION-LENGTH PRE-DECODE OF VARIABLE-LENGTH INSTRUCTIONS IN A SUPERSCALAR PROCESSOR

[75] Inventors: Shalesh Thusoo, Milpitas; James S. Blomgren, San Jose, both of Calif.

[73] Assignee: Exponential Technology Inc., San Jose, Calif.

[21] Appl. No.: 564,718

[22] Filed: Nov. 29, 1995

[51] Int. Cl.$^6$ .................................. G06F 9/30; G06F 9/38
[52] U.S. Cl. ............................ 395/386; 395/388
[58] Field of Search ................... 395/384, 386, 395/388, 389

[56] References Cited

U.S. PATENT DOCUMENTS

| | | | |
|---|---|---|---|
| 4,454,578 | 6/1984 | Matsumoto | 395/386 |
| 5,119,483 | 6/1992 | Madden et al. | 395/182.13 |
| 5,148,528 | 9/1992 | Fite et al. | 395/386 |
| 5,167,026 | 11/1992 | Murray et al. | 395/386 |
| 5,291,442 | 3/1994 | Emma et al. | 395/541 |
| 5,293,592 | 3/1994 | Fu et al. | 395/386 |
| 5,317,701 | 5/1994 | Reininger et al. | 395/383 |
| 5,353,420 | 10/1994 | Zaidi | 395/386 |
| 5,388,233 | 2/1995 | Hayes et al. | 395/384 |
| 5,410,721 | 4/1995 | Divine et al. | 395/800 |
| 5,418,736 | 5/1995 | Widigen et al. | 364/786 |
| 5,438,668 | 8/1995 | Coon et al. | 395/380 |
| 5,450,605 | 9/1995 | Grochowski et al. | 395/800 |
| 5,454,089 | 9/1995 | Nguyen et al. | 395/421.03 |
| 5,463,748 | 10/1995 | Schwendinger | 395/380 |

FOREIGN PATENT DOCUMENTS

| | | |
|---|---|---|
| 2263566 | 7/1993 | United Kingdom . |
| 2263985 | 11/1993 | United Kingdom . |
| 2263987 | 11/1993 | United Kingdom . |

*Primary Examiner*—David Y. Eng
*Attorney, Agent, or Firm*—Stuart T. Auvinen

[57] ABSTRACT

A superscalar processor can dispatch two instructions per clock cycle. The first instruction is decoded from instruction bytes in a large instruction buffer. A secondary instruction buffer is loaded with a copy of the first few bytes of the second instruction to be dispatched in a cycle. In the previous cycle this secondary instruction buffer is used to determine the length of the second instruction dispatched in that previous cycle. That second instruction's length is then used to extract the first bytes of the third instruction, and its length is also determined. The first bytes of the fourth instruction are then located. When both the first and the second instructions are dispatched, the secondary buffer is loaded with the bytes from the fourth instruction. If only the first instruction is dispatched, then the secondary buffer is loaded with the first bytes of the third instruction. Thus the secondary buffer is always loaded with the starting bytes of undispatched instructions. The starting bytes are found in the previous cycle. Once initialized, two instructions can be issued each cycle. Decoding of both the first and second instructions proceeds without delay since the starting bytes of the second instruction are found in the previous cycle. On the initial cycle after a reset or branch mis-predict, just the first instruction can be issued. The secondary buffer is initially loaded with a copy of the first instruction's starting bytes, allowing the two length decoders to be used to generate the lengths of the first and second instructions or the second and third instructions. Only two, and not three, length decoders are needed.

19 Claims, 5 Drawing Sheets

CYCLE 1

DBUF  A A A A B B B B C C C D D E

SBUF  A1 A2  SBUF INVALID
          ↳ CALC. SIZ_A, SIZ_B

DISPATCH INSTR. A

CYCLE 2

DBUF  B B B B C C C D D D E E E E F

SBUF  C1 C2  SBUF VALID
          ↳ CALC. SIZ_C, SIZ_D

DISPATCH INSTR. B & C

CYCLE 3

DBUF  D D D E E E E F F F F F F G G G

SBUF  E1 E2  SBUF VALID
          ↳ CALC. SIZ_E, SIZ_F

DISPATCH INSTR. D & E

CYCLE 4

DBUF | F F F F F F G G G G G H H H H H |

SBUF | G1 G2 | SBUF VALID
         └─→ CALC. SIZ_G, SIZ_H

DISPATCH INSTR. F ONLY

CYCLE 5

DBUF | G G G G G H H H H H H H  I  IJ J |

SBUF | H1 H2 | SBUF VALID
         └─→ CALC. SIZ_H, SIZ_I

DISPATCH INSTR. G & H

CYCLE 6

DBUF | I IJ J K K K K K L L M N O O O |

SBUF | J1  J2 | SBUF VALID
         └─→ CALC. SIZ_J, SIZ_K

DISPATCH INSTR. I & J

FIG. 3B

EARLY INSTRUCTION-LENGTH PRE-DECODE OF VARIABLE-LENGTH INSTRUCTIONS IN A SUPERSCALAR PROCESSOR

BACKGROUND OF THE INVENTION—FIELD OF THE INVENTION

This invention relates to computer systems, and more particularly for methods to decode instructions having a variable length.

BACKGROUND OF THE INVENTION— DESCRIPTION OF THE RELATED ART

Superscalar techniques increase the throughput of data processors. A superscalar processor has more than one execution facility so that more than one instruction may complete processing in any clock cycle. Each execution facility is typically divided into stages, or pipelined, to process several instructions at once. Thus a superscalar processor has several pipelines operating in parallel, and each pipeline may have several instructions in differing stages of completion.

One challenge in superscalar design is to decode several instructions in parallel before they are dispatched to the pipelines. RISC (reduced instruction set computer) instructions normally comprise a fixed number of bytes, so decoding a second RISC instruction in parallel with a first RISC instruction can be accomplished simply by fetching and decoding the next bytes after the end of the first RISC instruction. For example, when each RISC instruction is 4 bytes in size or length, the first four bytes are sent to a first RISC decoder, while the following four bytes are sent to a second RISC decoder. Both the first and the second RISC instruction can then be decoded in parallel in the same clock cycle and then dispatched to different pipelines.

CISC (complex instruction set computer) instructions do not have a fixed instruction length. This makes parallel instruction decoding problematic, as it is not known in advance where in the instruction stream the first instruction ends and the next begins. For example. the x86 instruction set is executed by microprocessors from such companies as Intel Corp. of Santa Clara, CA, Advanced Micro Devices of Sunnyvale, CA, Cyrix of Richardson TX, and others. In the x86 instruction set, an instruction's length varies from as little as one byte to fifteen bytes.

Prefixes can be added to the beginning of many CISC instructions to alter the instruction. These instruction prefixes also alter the length of the instruction. Typically the length of the x86 instruction is determined by these prefixes and other information contained in the first two bytes of the instruction word.

Several methods have been used to decode multiple variable-length instructions in parallel. Two or more clock cycles may be used for decode. Muxes and barrel shifters or rotators are well-known and can be used in a brute-force approach. Grochowski discloses a rotator scheme in U.K. Patent Application No. GB 2 263 985 A, entitled "Deriving variable length instructions from a stream of instructions." Grochowski and Shoemaker disclose a more complex scheme using end-bit markers in an instruction cache to indicate the end points of variable-length instructions in U.K. Patent Application No. GB 2 263 987 entitled "End Bit Markers for instruction decode." Both of these applications are assigned to Intel Corp. of Santa Clara CA. Of course, using additional rotators and adding marker bits into the cache can be very expensive, especially when wide rotators or large instruction caches are used. The timing may still be critical when using such techniques, as the second instruction may not be decoded until the rotation is complete or the end-bit marker is retrieved.

What is desired is a decoder for decoding multiple variable-length instructions in parallel. It is desired to begin decoding of the second instruction at the same time that the first instruction is decoded, without incurring a delay to determine the length of the first instruction being decoded. Thus the decoding of the second instruction is to be no more critical than the decoding of the first instruction, allowing the two decoders to be constructed with the same internal delays.

SUMMARY OF THE INVENTION

A pipelined decoder decodes instructions that have a variable length. The pipelined decoder is for decoding and dispatching at least two instructions in a cycle. The pipelined decoder has a primary instruction decode buffer that receives instructions from a memory. The primary instruction decode buffer has sufficient size to contain several instructions when the instructions have a smaller length. The instructions include in sequence a first instruction, a last instruction, a next instruction, and at least a portion of an after-next instruction.

A primary decoder receives a first instruction from the primary instruction decode buffer, and decodes the first instruction and dispatches a decoded first instruction to a first execution facility. A secondary instruction decode buffer receives a subset of the instructions in the primary instruction decode buffer. The secondary instruction decode buffer contains a size-determining portion of the last instruction to be dispatched in a cycle. The size-determining portion contains a sufficient portion of the last instruction to determine a length of the last instruction.

A last-instruction length decoder receives the size-determining portion of the last instruction from the secondary instruction decode buffer. It generates the length of the last instruction. A next-instruction extractor receives the length of the last instruction from the last-instruction length decoder. It extracts a size-determining portion of the next instruction from the primary instruction decode buffer. The next instruction is a next sequential instruction in an instruction stream after the last instruction, while the size-determining portion of the next instruction contains a sufficient portion of the next instruction to determine a length of the next instruction.

A next-instruction length decoder receives the size-determining portion of the next instruction from the next-instruction extractor, and generates the length of the next instruction. An after-next-instruction extractor receives the length of the next instruction from the next-instruction length decoder, and extracts a size-determining portion of the after-next instruction from the primary instruction decode buffer. The after-next instruction is a sequential instruction after the next instruction in the instruction stream, while the size-determining portion of the after-next instruction contains a sufficient portion of the after-next instruction to determine a length of the after-next instruction.

A loader loads the secondary instruction decode buffer. The loader receives the size-determining portion of the next instruction and receives the size-determining portion of the after-next instruction. The loader loads, for a next cycle, the secondary instruction decode buffer with the size-determining portion of the next instruction when only one instruction is dispatched, but the loader loads for the next cycle the secondary instruction decode buffer with the size-determining portion of the after-next instruction when two instructions are dispatched.

Thus when two instructions are dispatched in a cycle, the dispatched instructions are the first instruction and the last instruction. The secondary instruction decode buffer is loaded for the next cycle with the size-determining portion of the after-next instruction which was located by the next-instruction length decoder.

In other aspects of the invention a secondary decoder receives the last instruction. It decodes the last instruction and dispatches a decoded last instruction to a second execution facility. The secondary decoder receives the size-determining portion of the last instruction from the secondary instruction decode buffer but receives a remaining portion of the last instruction from the primary instruction decode buffer.

In some aspects of the invention the first execution facility and the second execution facility each comprise an execution pipeline comprised of a plurality of stages. The size-determining portion comprises a first two bytes of an instruction. The size-determining portion is sufficient to determine the length of many but not all instructions in a complex instruction set. An unpairable complex instruction has a size-determining portion that is insufficient to determine the length of the unpairable complex instruction, and the unpairable complex instruction is dispatched only by the primary decoder.

In still further aspects of the invention an initialization means loads the secondary instruction decode buffer with a size-determining portion of the first instruction and issues the first instruction as the last instruction for an initial cycle. Only one instruction is issued in the initial cycle. During the initial cycle the first instruction is the last instruction, whereas in other cycles the last instruction is an instruction following the first instruction. Thus the next-instruction length decoder and the after-next instruction length decoder are sufficient to determine the lengths of either the first and a second instruction during the initial cycle, or the lengths of the last and next instruction during other cycles. Thus only two instruction-length decoders are needed.

BRIEF DESCRIPTION OF THE DRAWINGS

FIGS. 3A, 3B show how instruction decode buffer (DBUF) and secondary instruction decode buffer (SBUF) are loaded and used to generate instruction lengths for the following cycles.

DETAILED DESCRIPTION

The present invention relates to an improvement in instruction decoders. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
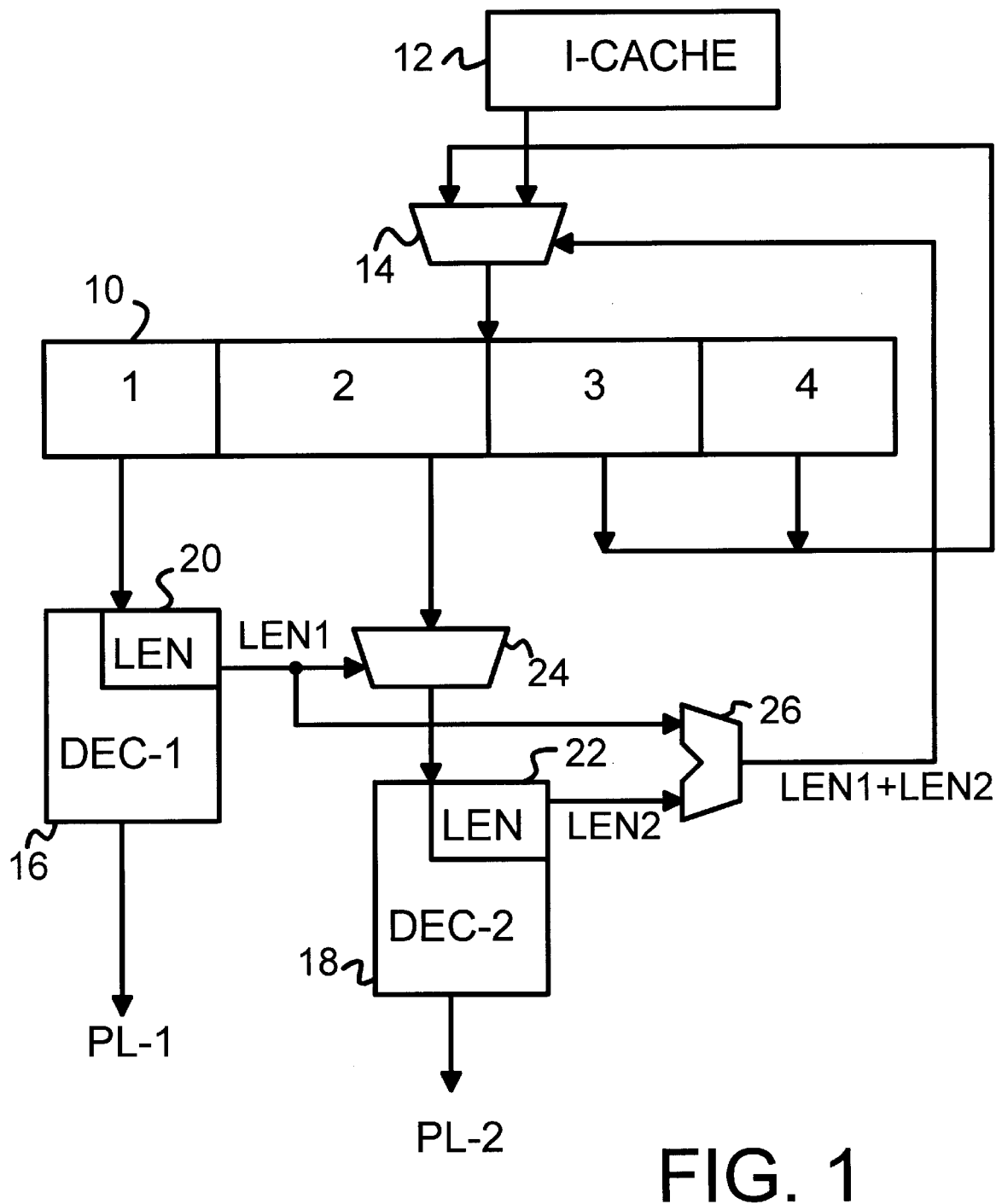
FIG. 1 shows a simple approach to decoding variable-length instructions.

FIG. 1 shows a simple approach to decoding variable-length instructions. An instruction buffer 10 receives bytes of the instruction stream from instruction cache 12. Instruction buffer 10 is large, capable of holding enough bytes for possibly several instructions. In the example of FIG. 1, four instructions are loaded into instruction buffer 10. The first instruction is aligned with the left edge of instruction buffer 10, so that the first byte in buffer 10 is the first byte of the first instruction to be decoded. First decoder 16 fully decodes the first instruction in buffer 10 and dispatches it to the first pipeline. First decoder 16 includes a length decoder 20 which determines the total length of the first instruction, LEN1. This length of the first instruction is used to control mux 24, which selects a subset of the bytes in instruction buffer 10 beginning with the first byte of the second instruction in buffer 10. These bytes from buffer 10 of the second instruction are then decoded by second decoder 18 and the second instruction is dispatched to the second pipeline.

Second decoder 18 also includes a length decoder 22 which outputs the length of the second instruction in buffer 10, LEN2. Adder 26 sums the lengths of the first and second instructions, LEN1+LEN2, and this sum controls mux 14 which recirculates the third and fourth instructions in buffer 10 and shifts them to the left edge of buffer 10, filling in from the right additional instruction bytes from the instruction stream from instruction cache 12.

A disadvantage of the decoding apparatus of FIG. 1 is that the decoding of the second instruction must wait until the length of the first instruction, LEN1, has been determined. While the delay in generating LEN1 is less than the delay to fully decode an instruction, it is a significant delay. Thus the decoding of the second instruction is delayed and is a critical path in the processor. The decoding of the second instruction is further delayed by the need to select appropriate bytes from instruction buffer 10 using mux 24. Thus the time available for decoding the second instruction is reduced by the delay to determine the length of the first instruction, LEN1, and the delay through mux 24. These additional delays may make it impossible to fully decode the second instruction in a single clock cycle, or may require that the clock cycle be extended.

LENGTH DECODE CAN BE PIPELINED

The inventors have realized that decoding of subsequent instructions can be pipelined. The full decoding itself does not have to be pipelined; only the length decoding is pipelined, reducing complexity and cost.

An approach is to find the length of each instruction in the instruction buffer. For example, if two instructions can be fully decoded and dispatched in any cycle, the length of the first, second, and third instructions can be generated in cycle X and saved until the following cycle X+1. Once the first and second instructions are dispatched in cycle X, then the third and fourth instructions are decoded in the following cycle X+1. Since the length of the instructions was determined in the previous cycle X, it is known at the start of the following cycle X+1 exactly where the beginnings of the third and fourth instructions are. Thus pipelining the length decoding provides the starting addresses of multiple instructions in the following cycle.

The inventors have also realized that there is no need to determine the length of the first instruction once pipelining is underway. Thus two, not three, length decodes are needed each cycle. The length of the second and the third instructions in the instruction decode buffer are determined each cycle.

Determine Length of Last Instruction Dispatched and Next Instruction

This method can be generalized for the case of three or more instructions being dispatched per clock cycle. In general, the length of the last instruction to be filly decoded or dispatched is determined, and the length of one or more instructions which follow the last instruction is also determined. These lengths are saved or used to align the instructions for the following cycle. Thus two or more instructions are aligned and immediately ready to start decoding at the start of the following clock cycle.

LENGTH PRE-DECODE APPARATUS

Figure 2:
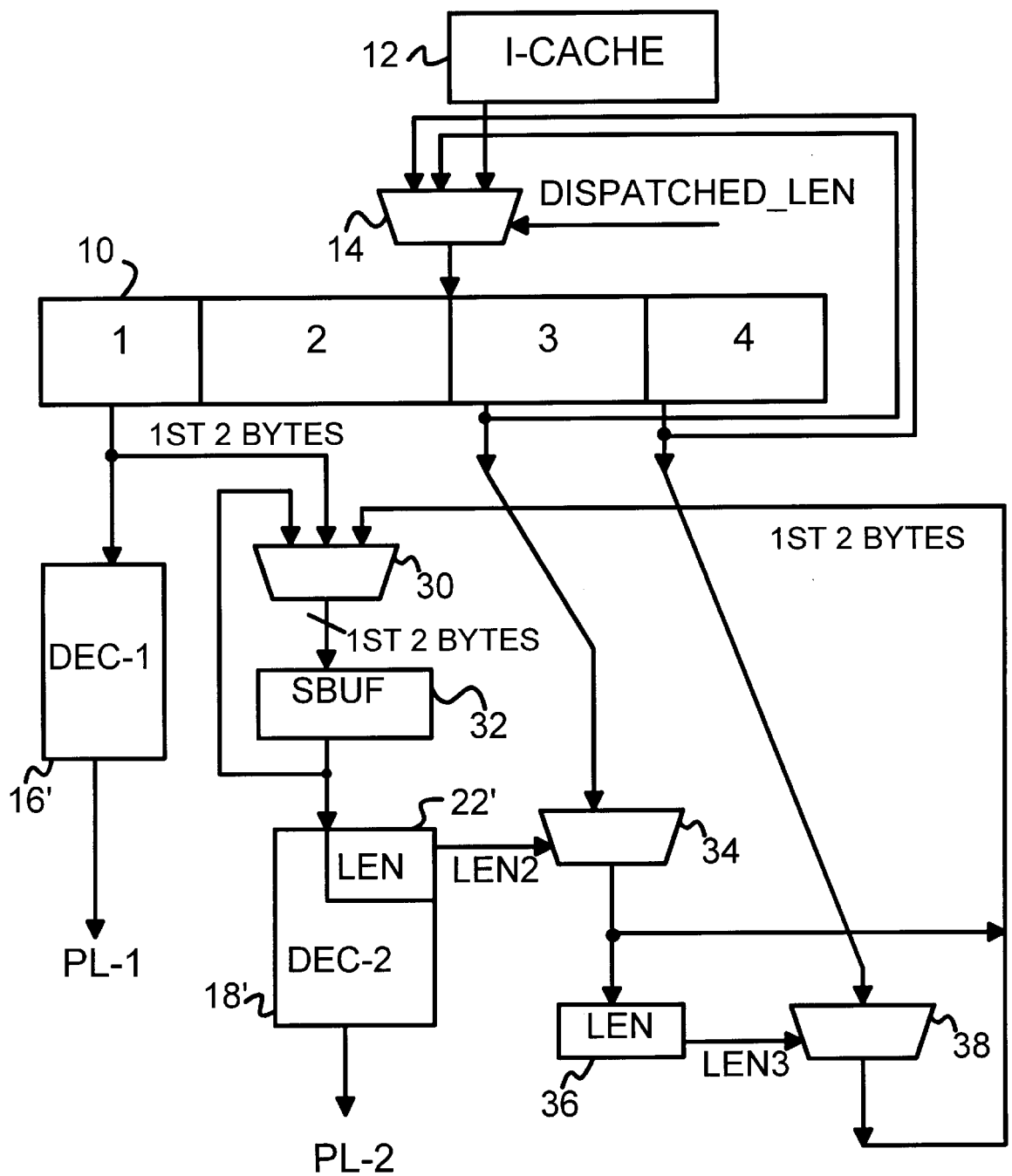
FIG. 2 is a pipelined decoder for variable-length instructions which generates the length of the last instruction that could be dispatched and the length of one subsequent instruction.

FIG. 2 is a pipelined decoder for variable-length instructions which generates the length of the last instruction that could be dispatched and the length of one subsequent instruction. Instruction decode buffer 10 (DBUF) contains enough bytes from instruction cache 12 to hold several instructions. The first instruction (1) is always aligned to the left boundary or edge of instruction decode buffer 10. Thus the first several bytes of instruction decode buffer 10 are sent to first decoder 16', which fully decodes the first instruction and dispatches it to the first pipeline.

Secondary instruction decode buffer 32 (SBUF) contains just the first two bytes of the last instruction to be dispatched in that cycle, normally the second instruction (2). Secondary instruction decode buffer 32 is loaded at the same time that instruction decode buffer 10 is loaded, and SBUF 32 contains a copy of two of the bytes that are also in instruction decode buffer DBUF 10. DBUF 10 contains 16 bytes, enough for perhaps several instructions. FIG. 2 shows four instructions (1,2,3,4) in DBUF 10. Only two bytes are also copied into SBUF 32, since these two bytes are all that is needed to determine the length of the second instruction. SBUF 32 thus holds the length-determining bytes of the second instruction.

These two length-determining bytes from SBUF 32 are sent to length decoder 22', which determines the length of the second instruction, LEN2. Second decoder 18' fully decodes the second instruction and dispatches it to the second pipeline. If the second instruction is greater than two bytes in length, then additional bytes of the second instruction are received from instruction decode buffer 10 (not shown) so that the second instruction may be fully decoded by second decoder 18'. The SBUF control bits, described later, are used to extract additional bytes from DBUF when needed for decoding.

The length of the second instruction, LEN2, controls mux 34 which selects the first two bytes of the third instruction from instruction decode buffer 10. These two bytes determine the length of the third instruction, LEN3, which is determined by length decoder 36. The length of the third instruction, LEN3, control mux 38 so that the first two bytes of the fourth instruction are selected from instruction decode buffer 10. Note that it is not required that all bytes of the fourth instruction be present in instruction decode buffer 10. Only the first two bytes of the fourth instruction must be present in instruction decode buffer 10 for this cycle. The additional bytes can be fetched from instruction cache 12 and shifted in using mux 14 for the following cycle.

The first two bytes of the fourth instruction, selected by mux 38, and the first two bytes of the third instruction, selected by mux 34, are input to SBUF loading mux 30. The two bytes from the fourth instruction are loaded into SBUF 32 when both the first and the second instructions are dispatched. When just the first instruction is dispatched, the two bytes from the third instruction are loaded into SBUF by SBUF loading mux 30. When no instruction is dispatched, the contents of SBUF 32 are recirculated through SBUF loading mux 30.

Initialization of Length Decoder Prevents Superscalar Dispatch for First Cycle

On initialization, such as after reset, an interrupt, exception, or a mis-predicted branch, the first two bytes of the first instruction are loaded into SBUF 32 through SBUF loading mux 30. These bytes from the first instruction are marked as invalid to disable second decoder 18' until the first instruction is dispatched, although length determination and byte selection is still performed. Thus for the very first cycle SBUF 32 receives the first instruction rather than the second instruction. This allows the length of the first instruction to be generated by length decode 22'. Even though just one instruction can be dispatched for the first clock cycle after initialization, two instructions can be issued for the following cycles. Once initialized, two instructions can be dispatched or issued each cycle. Initialization is very rapid, requiring just one clock cycle.

SBUF 32 and DBUF 10 are loaded by the edge of the system clock. Decoding by first decoder 16' and second decoder 18' begins as soon as the newly loaded bytes propagate through the buffers 10, 32. SBUF loading mux 30 and mux 14 should have stable inputs a set-up delay before the system clock edge. Mux 14 shifts the remaining bytes in DBUF 10 over to the left by the number of bytes dispatched in the first and second instructions, DISPATCHED_LEN. New instruction bytes from instruction cache 12 are shifted or muxed in to the right by mux 14.

EXAMPLE OF OPERATION

Figure 3A:
Figure 3A:
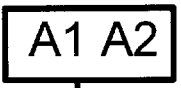
Figure 3A:
Figure 3A:
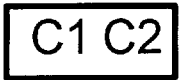
Figure 3A:
Figure 3A:

FIGS. 3A, 3B show how instruction decode buffer 10 (DBUF) and secondary instruction decode buffer 32 (SBUF) are loaded and used to generate instruction lengths for the following cycles. Upon initialization, DBUF is loaded with 16 bytes of instructions, which include four full instructions (labeled A, B, C, D) and part of a fifth instruction, E. Since the length pre-decode apparatus is being initialized, the first two bytes of the first instruction, A, are also copied into SBUF, although these bytes are not validated for SBUF to prevent the same first instruction from being dispatched in two different pipelines.

In the first cycle the length of the instruction in SBUF, instruction A, is calculated. The length of the instruction (B) after the instruction in SBUF (A) is also generated, and SIZ_A and SIZ_B are used to load SBUF for the next cycle. Instruction A is dispatched, and instruction A's bytes are removed from DBUF and the remaining bytes are left-shifted to align instruction B with the left boundary of DBUF. Additional bytes of instruction E and one byte from instruction F are fetched from the instruction cache and loaded into the right side of DBUF. SBUF is loaded with the first two bytes of the third instruction, instruction C. SIZ_A and SIZ_B that are generated in cycle 1 are used to find the starting byte of instruction C.

In cycle 2 the two bytes of instruction C in SBUF are validated, allowing instruction C to be fully decoded and dispatched in cycle 2, along with instruction B from DBUF and the first decoder. The length of instruction C in SBUF, SIZ_C, and the following instruction's length, SIZ_D, are generated. This allows the first bytes of instruction E to be located and selected to be loaded into SBUF for decoding in cycle 3.

At the start of cycle 3, the instruction bytes for instructions B and C are removed from DBUF, and the bytes for instructions D, E, and F are left-shifted and additional bytes are loaded from the cache. SBUF is clocked to load the first bytes of instruction E which are decoded and dispatched along with instruction D. The size of instruction E in SBUF and the following instruction F are generated, SIZ_E, SIZ_F. From these sizes the staring bytes of instruction G are located and loaded into SBUF at the beginning of cycle 4.

Continuing on FIG. 3B, for cycle 4 instructions D and E have been removed from DBUF, and instructions F and G shifted over, with bytes for instruction H shifted in from the right. The size of instructions G and H are calculated, SIZ_G, SIZ_H. However, only the first instruction, F, can be dispatched, perhaps because of a pipeline stall or another conflict. From SIZ_G the starting bytes of instruction H are located and loaded into SBUF for cycle 5. The length of instruction H was generated in cycle 4 but not needed since only one instruction is dispatched in cycle 4.

For cycle 5 only one instruction's bytes (F's) are removed from DBUF, since only instruction F was dispatched in the last cycle 4. The other instruction's bytes are again shifted over. The length of instruction H in SBUF is again generated (SIZ_H), as is the length of instruction I, SIZ_I. Since two instructions are dispatched in cycle 5, two instructions, G and H, are removed from DBUF and SBUF is loaded with the first bytes of instruction J using SIZ_H and SIZ_I that are generated in cycle 5.

In cycle 6 two instructions, I and J, are again dispatched, and SBUF is again used to generate the lengths of the last instruction dispatched, SIZ_J, as well as the following instruction's length, SIZ_K. Instructions I and J are only two bytes in length, while other instructions were several bytes longer. Should an extremely long instruction be loaded into DBUF, it may not be possible to correctly generate the lengths of instructions following it. This may result in only one instruction being dispatched for one or two cycles.

One-Hot Control Bits Point to Start of Instructions

Figure 4:
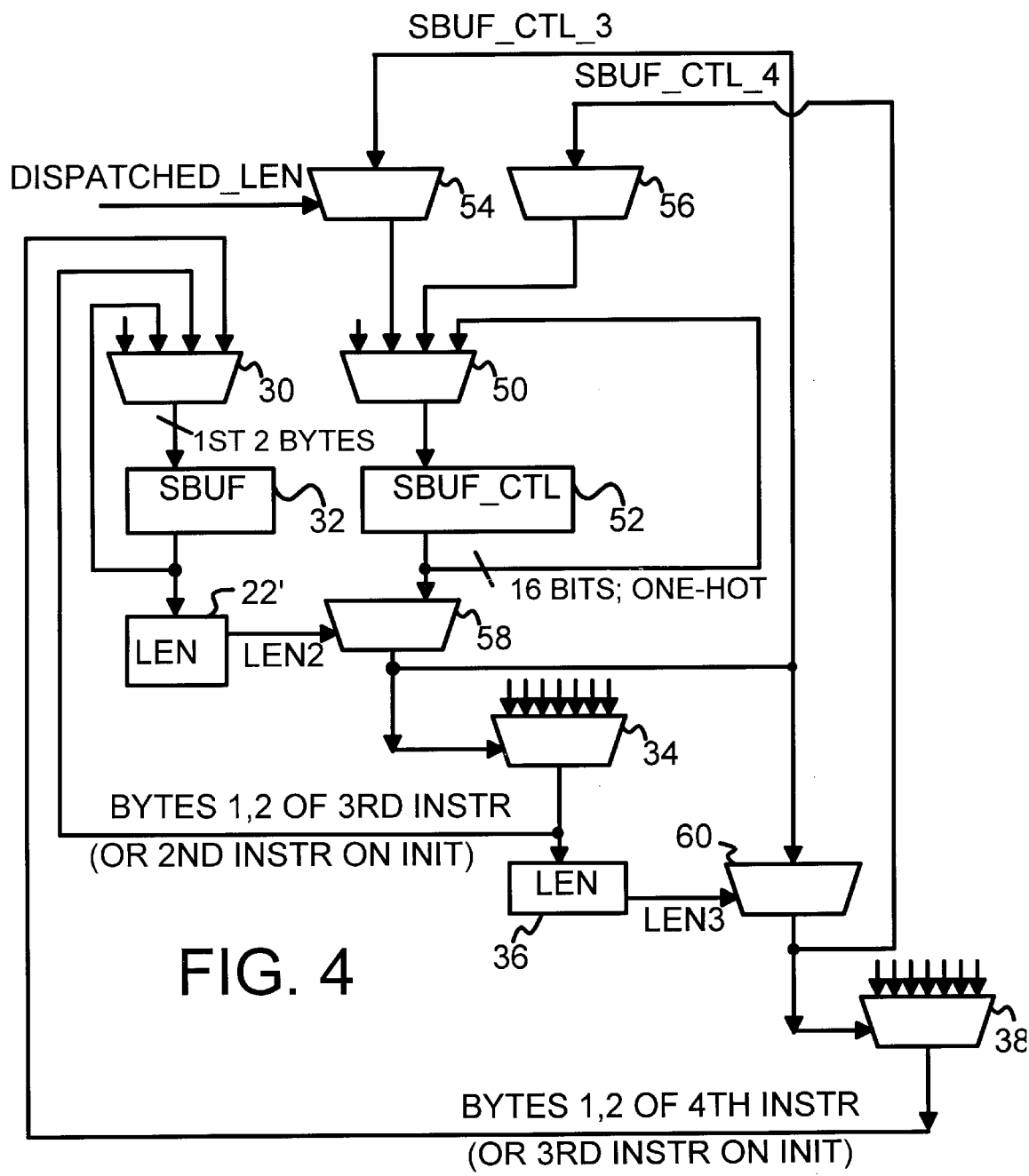
FIG. 4 illustrates in more detail the muxing of length-decode information and instruction bytes shown in FIG. 2.

FIG. 4 illustrates in more detail the muxing of length-decode information and instruction bytes shown in FIG. 2. Secondary decode buffer SBUF 32 is loaded by the system clock edge from SBUF loading mux 30. SBUF loading mux 30 receives the first two bytes from DBUF (not shown) which are loaded into SBUF 32 on initialization. When no instructions are dispatched, the contents of SBUF 32 are re-circulated through SBUF loading mux 30. When one instruction is dispatched, the first two bytes of the third instruction are loaded from mux 34, which selects these bytes from the bytes in DBUF. When two instructions are dispatched, the first two bytes of the fourth instruction in DBUF are selected by mux 38 and SBUF loading mux 30 for loading into SBUF 32 on the next system clock edge.

SBUF control bits are used to point to the beginning of the second instruction in DBUF. For example, when the first instruction is five bytes in length, the SBUF control bits use one-hot encoding to point to the sixth byte in DBUF as the location of the first byte of the second instruction: 0000010000000000. These SBUF control bits are stored in SBUF control register 52. These control bits from control register 52 are shifted to the right in mux 58 by the length of the second instruction, LEN2, generated from SBUF register 32 by length decoder 22'. Thus after mux 58 the modified SBUF control bits (designated SBUF_CTL_3) now contain a one-hot bit that points to the first byte of the third instruction. SBUF_CTL3 controls mux 34 to select the first two bytes of the third instruction, which are sent to length decoder 36 to generate the length of the third instruction, LEN3. The modified SBUF control bits, SBUF_CTL_3, from mux 58, are again right-shifted. SBUF_CTL_3 is shifted by LEN3 to yield SBUF_CTL_4, which points to the first byte of the fourth instruction. SBUF_CTL_4 then selects the first two bytes of the fourth instruction in DBUF using mux 38, and these first two bytes of the fourth instruction are sent to SBUF loading mux 30, possibly to be loaded into SBUF on the next clock edge.

Muxes 54, 56 left-shift SBUF_CTL_3 and SBUF_CTL_4 by the number of bytes dispatched, DISPATCHED_LEN, which is the number of bytes for the first and second instructions. These shifted SBUF control bits from muxes 54, 56 are selected by loading mux 50 when one or two instructions are dispatched, respectively. When no instructions are dispatched, the unshifted contents of SBUF control bits register 52 are re-circulated through loading mux 50. On initialization, the vector 1000000000000000 is loaded through the left input of loading mux 50.

SBUF Loading Altered at End of Initialization

During most cycles, when two instructions are dispatched, SBUF is loaded with the bytes from the fourth instruction, which are output from mux 38. If just one instruction is dispatched, SBUF is loaded with the third instruction from mux 34. During the initial cycle however, SBUF contains the bytes from the first instruction. Thus the LEN2 that is generated is the length of the first instruction rather than the second instruction. Likewise LEN3 is the length of the second, not the third instruction on the initial cycle. This must be taken into account for the control of the SBUF loading mux 30 and the SBUF control bits loading mux 50. For the initial cycle only, if the first instruction is not dispatched, then the second instruction's bytes are selected from mux 34 while the control bits are selected from mux 58. In the following cycle both the first and the second instructions may be dispatched together.

If the first instruction is dispatched in the initial cycle, then SBUF is loaded with the third instruction's bytes from mux 38 (which normally select the fourth instruction's bytes). The SBUF control bits are selected from mux 60.

This adjustment is only necessary for the first cycle. The bytes output from the pre-decoder are essentially the bytes from one earlier instruction than usual. This adjustment allows the same two length decoders to find the start of the third and fourth instructions in normal operation, without having to explicitly find the length of the first instruction each cycle. However, for initialization, the length of the first instruction and the length of the second instruction are found using the same two length decoders normally used for the second and third instructions. This occurs because the secondary decode buffer is also loaded with the first instruction on initialization, but is never loaded with the first instruction during normal operation. Thus just two length decoders can be used rather than three length decoders. The hardware is reduced from three length decoders.

Muxes 30, 50 can be controlled by the same select signals by following the rules described in this section. Muxes 34, 38, 30 are each two bytes in width, and preferably have staggered inputs from the possible bytes from DBUF.

Valid Bits For Instruction Decode Buffer

Another register is provided for valid bits for DBUF. Since DBUF contains up to 16 bytes of the instruction stream, the DBUF valid-bit register contains 16 valid bits, one for each byte. When the instruction cache is unable to completely fill DBUF, it clears some of the valid bits for the unfilled bytes of DBUF. These valid bits can also be used for branch instructions. When a branch is mis-predicted (or taken if there is no prediction), the instruction bytes are no longer valid since they are fetched from the sequential instruction stream. These instruction bytes may be invalidated in DBUF by clearing their valid bits.

ALTERNATE EMBODIMENTS

Several other embodiments are contemplated by the inventors. For example a more complex instruction dispatcher may be used to optimize the instruction dispatch to the pipelines. The first instruction to be decoded may be dispatched to the second pipeline instead of the first pipeline. However, having the second instruction from the secondary instruction buffer only load the second decoder has a speed advantage since the loading on the wires to the second decoder is minimized, and a level of muxing is eliminated. The reduced loads can improve cycle time. The decoders themselves may only decode a portion of the entire instruction set, and may differ from other decoders so that some decoders are specific for certain types of instructions, such as branch instructions or load/store or ALU instructions. Out-of-order instruction dispatch can also be employed.

End bits in the instruction cache can also be used with the invention, although the invention eliminates the need for these end-bit markers. These end-bits mark the end of an instruction in a cache. Since the end of the instructions are only known after decoding, the end bits are only set after the instructions have been executed a first time. Thus end bits cannot help for non-looping code with instructions that are only executed once. The additional logic for decoding the second instruction in a cycle may also be powered down or disabled for a uniscalar design. Additional length decoders and muxing logic can be added to allow for dispatch of three or more instructions in a cycle. Additional secondary buffers and full decoders must also be added. A simple extension to three instructions dispatched per clock cycle uses another secondary decode buffer (TBUF) for the third instruction. Additional length decoders and muxes are provided starting with this third instruction's length. This can be done by copying the same SBUF instruction into the third buffer, TBUF. Two more size decoders are driven by TBUF, as for SBUF. Initializing TBUF requires two cycles instead of one before 3 instructions per cycle can be sustained.

The invention has been described as using the first two bytes of an instruction for length determination. More complex instructions may use more than two bytes for length determination. However, these instruction are rare, and the decoder can simply not support these instructions for superscalar dispatch. When such an instruction is encountered, the dispatch control unit prevents the instruction from being the second instruction dispatched, or may prevent another instruction from being dispatched when the complex instruction is the first instruction. CISC x86 instruction that are 7 bytes or less in length generally use only two bytes for length determination.

The secondary instruction decode buffer may be physically eliminated when control bits are used to point to the size-determining bytes of the last instruction within the main instruction decode buffer. In that case the secondary buffer may merely buffer the bytes from the main instruction buffer using inverters or other buffers or line drivers, or no active buffer may be used at all.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not only by this detailed description, but rather by the claims appended hereto.

We claim:

1. A pipelined decoder for decoding instructions having a variable length, the pipelined decoder for decoding and dispatching at least two instructions in a cycle, the pipelined decoder comprising:

a primary instruction decode buffer, receiving instructions from a memory, the primary instruction decode buffer having sufficient size to contain several instructions when the instructions have a smaller length, the instructions including in sequence a first instruction, a last instruction, a next instruction, and at least a portion of an after-next instruction;

a primary decoder, receiving a first instruction from the primary instruction decode buffer, for decoding the first instruction and dispatching a decoded first instruction to a first execution facility;

a secondary instruction decode buffer, receiving a subset of the instructions in the primary instruction decode buffer, the secondary instruction decode buffer for containing a size-determining portion of the last instruction to be dispatched in a cycle, the size-determining portion containing a sufficient portion of the last instruction to determine a length of the last instruction;

a last-instruction length decoder, receiving the size-determining portion of the last instruction from the secondary instruction decode buffer, for generating the length of the last instruction;

a next-instruction extractor, receiving the length of the last instruction from the last instruction length decoder, for extracting a size-determining portion of the next instruction from the primary instruction decode buffer, the next instruction being a next sequential instruction in an instruction stream after the last instruction, the size-determining portion of the next instruction containing a sufficient portion of the next instruction to determine a length of the next instruction;

a next-instruction length decoder, receiving the size-determining portion of the next instruction from the next-instruction extractor, for generating the length of the next instruction;

an after-next-instruction extractor, receiving the length of the next instruction from the next-instruction length decoder, for extracting a size-determining portion of the after-next instruction from the primary instruction decode buffer, the after-next instruction being a sequential instruction after the next instruction in the instruction stream, the size-determining portion of the after-next instruction containing a sufficient portion of the after-next instruction to determine a length of the after-next instruction; and a loader for loading the secondary instruction decode buffer, the loader receiving the size-determining portion of the next instruction and receiving the size-determining portion of the after-next instruction, the loader loading for a next cycle the secondary instruction decode buffer with the size-determining portion of the next instruction when only one instruction is dispatched, but the loader loading for the next cycle the secondary instruction decode buffer with the size-determining portion of the after-next instruction when two instructions are dispatched, whereby when two instructions are dispatched in a cycle, the dispatched instructions are the first instruction and the last instruction, the secondary instruction decode buffer being loaded for the next cycle with the size-determining portion of the after-next instruction which was located by the next-instruction length decoder.

2. The pipelined decoder of claim 1 further comprising:

a secondary decoder, receiving the last instruction, for decoding the last instruction and dispatching a decoded last instruction to a second execution facility.

3. The pipelined decoder of claim 2 wherein the secondary decoder receives the size-determining portion of the last instruction from the secondary instruction decode buffer but receives a remaining portion of the last instruction from the primary instruction decode buffer.

4. The pipelined decoder of claim 2 wherein the secondary decoder receives the entire last instruction including the size-determining portion of the last instruction from the primary instruction decode buffer.

5. The pipelined decoder of claim 2 wherein the first execution facility and the second execution facility each comprise an execution pipeline comprising a plurality of stages.

6. The pipelined decoder of claim 2 wherein the size-determining portion comprises a first two bytes of an instruction, the size-determining portion sufficient to determine the length of many but not all instructions in a complex instruction set, wherein an unpairable complex instruction has a size-determining portion that is insufficient to determine the length of the unpairable complex instruction, the unpairable complex instruction being dispatched only by the primary decoder.

7. The pipelined decoder of claim 2 further comprising:

initialization means for loading the secondary instruction decode buffer with a size-determining portion of the first instruction and issuing the first instruction as the last instruction for an initial cycle, wherein only one instruction is issued in the initial cycle;

wherein during the initial cycle the first instruction is the last instruction, whereas in other cycles the last instruction is an instruction following the first instruction, whereby the next-instruction length decoder and the after-next instruction length decoder are sufficient to determine the lengths of either the first and a second instruction during the initial cycle, or the lengths of the last and next instruction during other cycles, whereby only two instruction-length decoders are needed.

8. The pipelined decoder of claim 7 further comprising:

recirculating means, receiving the size-determining portion of the last instruction from the secondary instruction decode buffer, for re-loading the secondary instruction decode buffer with the size-determining portion of the last instruction when no instructions are dispatched in a cycle other than the initial cycle, initial loading means for loading the secondary instruction decode buffer with the size-determining portion of the next instruction when no instructions are dispatched in the initial cycle, the initial loading means loading the secondary instruction decode buffer with the size-determining portion of the after-next instruction when the first instruction is dispatched in the initial cycle.

9. The pipelined decoder of claim 8 further comprising:

control bits for indicating a location within the primary instruction decode buffer of the size-determining portion of the last instruction;

control update means, receiving the control bits, for adjusting the control bits for a sum of the lengths of the instructions dispatched, the control update means also adjusting for the length of the last instruction when at least one instruction is dispatched and adjusting for the length of the next instruction when at least two instructions are dispatched, whereby the control bits are adjusted each cycle an instruction is dispatched to continue to indicate the location within the primary instruction decode buffer of the size-determining portion of the last instruction.

10. The pipelined decoder of claim 9 wherein the control bits comprise one bit for each byte of an instruction in the primary instruction decode buffer and wherein the control bits are adjusted by shifting by the number of bytes of each instruction's length.

11. The pipelined decoder of claim 10 wherein the secondary instruction decode buffer merely buffers the size-determining portion of the last instruction from the primary instruction decode buffer, the secondary instruction decode buffer not containing storage elements while the primary instruction decode buffer is comprised of storage register cells, the control bits indicating which portion of the primary instruction decode buffer to select for buffering by the secondary instruction decode buffer.

12. A method for decoding two instructions per cycle, the two instructions having a variable length, the method comprising the steps of:

loading an instruction buffer with several instructions including a first instruction, a last instruction, a next instruction, and an after-next instruction which occur in an instruction stream in an order: first, last, next, after-next;

reading control bits which indicate a starting position within the instruction buffer of the last instruction;

determining a length of the last instruction from a portion of the last instruction, the portion of the last instruction indicated by the control bits;

adjusting the control bits by the length of the last instruction to generate next control bits, the next control bits indicating the starting position of the next instruction;

extracting from the instruction buffer a starting portion of the next instruction using the next control bits to indicate the starting portion of the next instruction;

determining the length of the next instruction from the starting portion of the next instruction extracted from the instruction buffer;

adjusting the next control bits by the length of the next instruction to generate after-next control bits, the after-next control bits indicating the starting position of the after-next instruction;

extracting from the instruction buffer a starting portion of the after-next instruction using the after-next control bits to indicate the starting portion of the after-next instruction;

updating the control bits with the after-next control bits when both the first and the last instructions are dispatched in an operating cycle, but updating the control bits with the next control bits when just the first instruction is dispatched in the operating cycle, but not updating the control bits when no instruction is dispatched, whereby two instructions may be dispatched per operating cycle wherein the next instruction and the after-next instruction are not dispatched in the operating cycle but their lengths are determined, allowing the positions of two instructions to be generated in the operating cycle before being dispatched.

13. The method of claim 12 further comprising the steps of:

during an initialization cycle initializing the control bits to indicate the location of the first instruction in the instruction buffer whereby the last instruction is the same instruction as the first instruction during the initialization cycle;

updating the control bits with the after-next control bits when the first instruction is dispatched in the initialization cycle, but updating the control bits with the next control bits when the first instruction is not dispatched in the initialization cycle, wherein the operating cycle is not the initialization cycle, the steps of determining the length of the last and next instructions determine the lengths of the first and a second instruction immediately following the first instruction during the initialization cycle, but during operating cycles the steps of determining the length of the last and next instructions do not determine the length of the first instruction but only the lengths of the second instruction immediately following the first instruction and a third instruction following the second instruction.

14. The method of claim 13 wherein the initialization cycle occurs after reset or after a mis-predicted branch or after an interrupt or after an exception.

15. The method of claim 12 further comprising the step of:

removing the first instruction from the instruction buffer when the first instruction is dispatched;

removing the last instruction from the instruction buffer when the last instruction is dispatched;

fetching additional instructions to the instruction buffer when an instruction is removed from the instruction buffer.

16. The method of claim 15 wherein the step of adjusting the control bits comprises:

shifting the control bits in proportion to the length of the last instruction to generate the next control bits;

and wherein the step of adjusting the next control bits comprises shifting the next control bits in proportion to the length of the next instruction to generate the after-next control bits.

17. The method of claim 16 wherein the step of updating the control bits comprises shifting the next control bits and the after-next control bits by the length of the first instruction when just the first instruction is dispatched, but shifting the next control bits and the after-next control bits by the lengths of the first instruction and the last instruction when both the first instruction and the last instruction are dispatched.

18. A decoder for decoding two instructions per cycle, the two instructions having a variable length, the decoder comprising:

an instruction buffer having a capacity to hold several instructions including a first instruction, a last instruction, a next instruction, and an after-next instruction which occur in an instruction stream in an order: first, last, next, after-next;

control bits for indicating a starting position within the instruction buffer of the last instruction;

last means, receiving a portion of the last instruction, for determining a length of the last instruction from the portion of the last instruction, the portion of the last instruction indicated by the control bits;

next control bits for indicating the starting position of the next instruction;

adjusting means for adjusting the control bits by the length of the last instruction, and for generating next control bits;

next-instruction extracting means, coupled to the instruction buffer, for extracting a starting portion of the next instruction using the next control bits to indicate the starting portion of the next instruction;

next means, receiving the starting portion of the next instruction extracted from the instruction buffer, for determining the length of the next instruction;

after-next control bits for indicating the starting position of the after-next instruction;

second adjusting means for adjusting the next control bits by the length of the next instruction to generate after-next control bits;

after-next extracting means, coupled to the instruction buffer, for extracting a starting portion of the after-next instruction using the after-next control bits to indicate the starting portion of the after-next instruction;

updating means for updating the control bits with the after-next control bits when both the first and the last instructions are dispatched in an operating cycle, but for updating the control bits with the next control bits when just the first instruction is dispatched in the operating cycle, whereby two instructions may be dispatched per operating cycle wherein the next instruction and the after-next instruction are not dispatched in the operating cycle but their lengths are determined, allowing the positions of two instructions to be generated in the operating cycle before being dispatched.

19. The decoder of claim 18 further comprising:

initialization means for initializing the control bits to indicate the location of the first instruction in the instruction buffer during an initialization cycle, whereby the last instruction is the same instruction as the first instruction during the initialization cycle;

control-bit updating means for updating the control bits with the after-next control bits when the first instruction is dispatched in the initialization cycle, but for updating the control bits with the next control bits when the first instruction is not dispatched in the initialization cycle, wherein the operating cycle is not the initialization cycle.

* * * * *